H. R. WARDELL.
BITUMINOUS STRUCTURAL MATERIAL.
APPLICATION FILED FEB. 11, 1911.
1,015,919.
Patented Jan. 30, 1912.
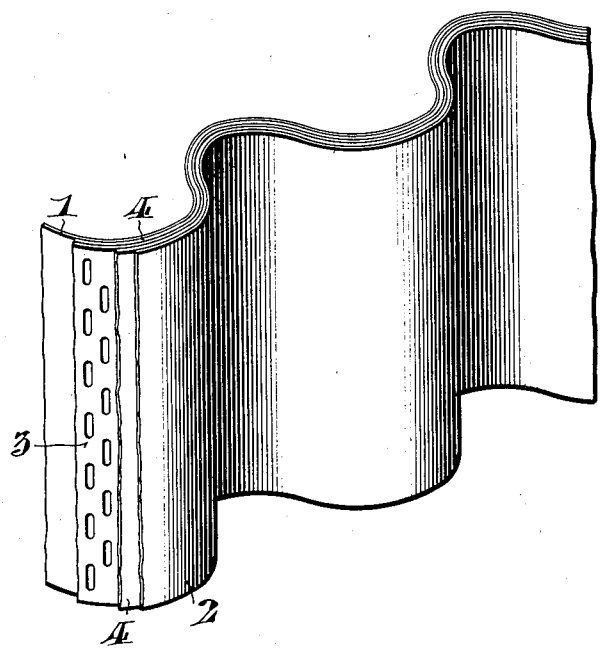
Witnesses
John C. Bergner
James H. Bell
Inventor
Henry Robbins Wardell,
by Tully & Paul
Attorneys

UNITED STATES PATENT OFFICE.

HENRY R. WARDELL, OF NEW YORK, N. Y.

BITUMINOUS STRUCTURAL MATERIAL.

1,015,919.  Specification of Letters Patent.  Patented Jan. 30, 1912.

Application filed February 11, 1911. Serial No. 607,956.

*To all whom it may concern:*

Be it known that I, HENRY R. WARDELL, of New York, in the county of New York and State of New York, have invented certain new and useful Improvements in Bituminous Structural Materials, whereof the following is a specification, reference being had to the accompanying drawings.

My improvements relate to a structural material in the form of a corrugated composite sheet, composed of bituminous cement, combined with textile or felted fabrics and reinforced by a thin perforated metallic sheet whereby there is imparted to the material sufficient rigidity to enable it to be used as a self-supporting structural material, as for example for a wall or roof of a building. To this end my structural material is composed of layers, such as roofing fabrics, saturated with a bituminous cement, and also an internal strengthening layer composed of hard bituminous cement, within which is embedded a thin perforated metallic sheet. This layer of hard cement reinforced by the metallic sheet gives to the structure great strength, while the other layer or layers of fabric saturated with bituminous cement effectually protect the strengthening layer from deteriorating influences.

I will describe a structural material embodying my invention, reference being had to the accompanying drawing, in which the figure shows a portion of a corrugated sheet embodying my invention.

This sheet is made up of three layers, namely, the external protecting layers, 1, and 2, and the internal strengthening layer, which lies between them. This internal layer is in turn composed of an intermediate reinforcing layer 3, consisting of a thin perforated metallic sheet and layers of hard bituminous cement 4, 4, covering the surfaces of the sheet metal, passing through its perforations, and forming a single homogeneous mass reinforced by the sheet metal embedded therein. The internal layer is preferably formed of a hard pure native bitumen, as for example grahamite, or gilsonite. This is properly fluxed until it is of such consistency at 77 degrees F., that when tested for five seconds with a No. 2, cambric needle, under a hundred gram weight, it will be penetrated to a depth of about 0.10 mm. The consistency may be varied depending upon the viscosity of the bitumen employed, so long as the main object is attained, which is to produce a structural layer which will retain its shape and have sustaining power under maximum sun temperatures. Regard should also be had, in determining the consistency of this material, to the conditions under which the structure is to be used. The structural strength and sustaining power of this layer is increased by embedding within it a perforated metal sheet as shown in the figure. This metallic sheet 3, consists of a thin sheet with transverse oblong perforations, but the shape and extent of the perforations may vary. The combined area of the perforations should be sufficiently great to cause the bituminous material on either side of the sheet to be so fully united by means of the bituminous material entering the perforations as to substantially constitute one mass of material reinforced by the embedded sheet. This is by way of contradistinction to the use of an unperforated sheet with two layers of cementing material one on either side. In the latter case, the strength of the sheet is dependent upon the adhesive force with which the cement clings to the surface of the metal, while in the structure which I have described this is not an important factor, since the perforations are sufficiently numerous and of sufficient area to give unity to the entire body of cement, notwithstanding the metal sheet embedded therein. On either side of this internal strengthening sheet there is placed an external protective layer 1, and 2. This external layer may consist of ordinary felted fabric commonly used in bituminous roofings properly saturated with a bituminous cement which should be of a softer consistency than that employed in the internal layer. By making the external layers with a cement of softer consistency the cracking of the protective layers is prevented, so as to prevent atmospheric influences from working upon the internal layer to its deterioration.

The employment of internal and external layers having different characteristics, as above set forth, has been previously described by me in Letters Patent of the United States No. 851,331, granted to me under date of April 23rd, 1907, and in Letters Patent of the United States No. 958,450, granted to me under date of May 17th, 1910, and I do not herein claim the same. My present invention is directed specifically to the reinforcement of the central strengthening layer of a composite bituminous structural material by the embedding therein of the thin perforated metal sheet as shown. Nor do I claim in the present case, the employment of a reinforcing structure of woven wire mesh, as described in my Patent No. 958,450. Such a wire mesh is not the same in its strengthening effect as the perforated metal sheet. Under strains of use, crossing wires of a woven metal structure move in relation to each other, and thereby facilitate their loosening from the bituminous surfaces to which they ought to adhere. On the other hand, a perforated metal sheet does not possess this capacity, for one part to move in relation to the other. It will be understood that when I speak of a perforated metal sheet, the words are used in their exact sense, as referring to a sheet of metal, which has been perforated, as distinguished from such a structure as the wire mesh described in my previous patent.

Having thus described my invention, I claim:—

A corrugated composite bituminous structural material consisting of an internal layer of hard bituminous cement reinforced by a thin perforated metallic sheet embedded therein having combined with it one or more external protective bituminous sheets.

In testimony whereof, I have hereunto signed my name at New York, New York, this seventh day of February 1911.

HENRY R. WARDELL.

Witnesses:
 A. J. ARIEL,
 ERNEST SEARING.